Aug. 27, 1957  G. R. COLLINS  2,804,110
KEYHOLE SAW WITH DOUBLE PARALLEL CUTTING EDGES
Filed Jan. 5, 1954
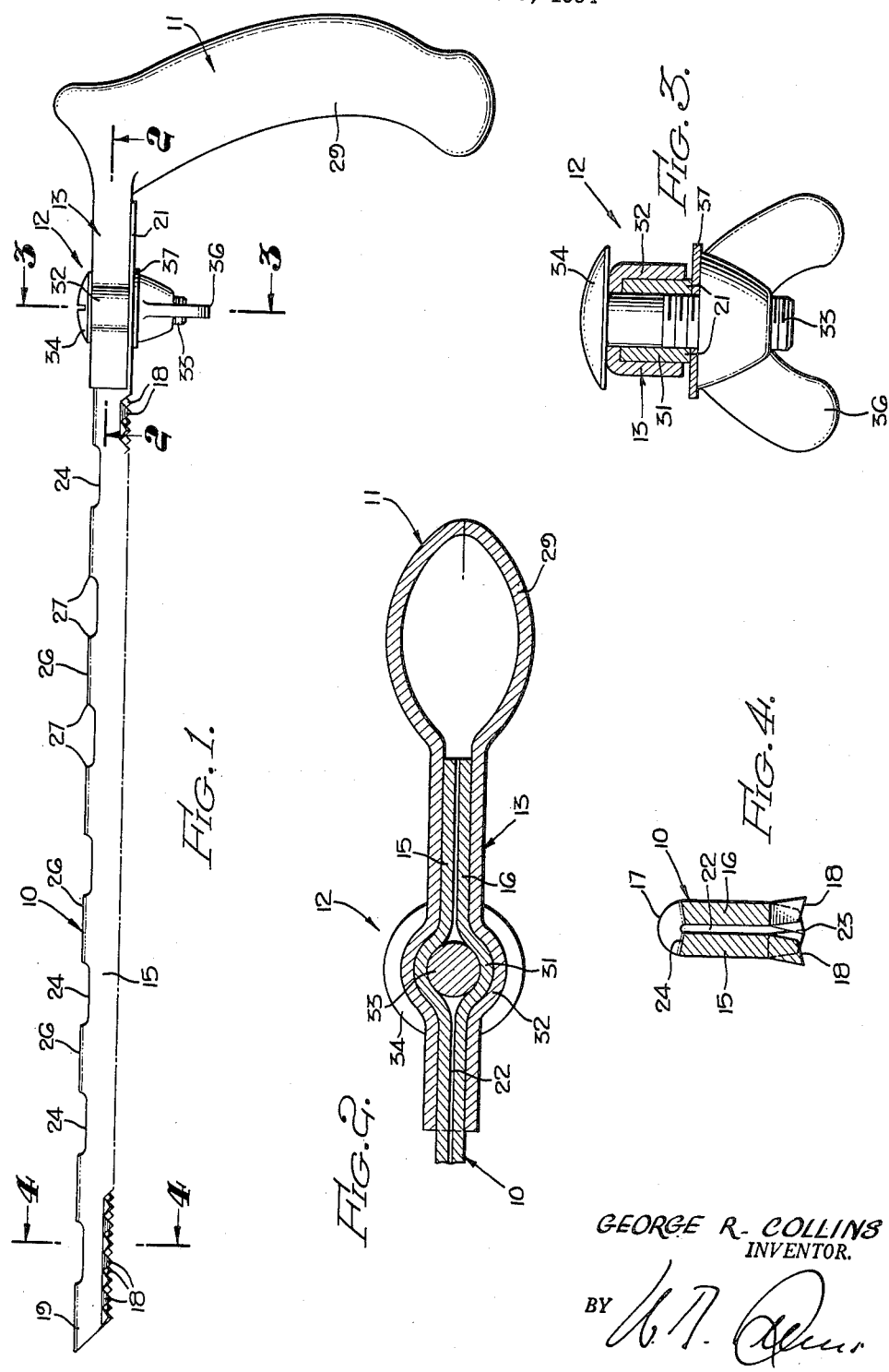
GEORGE R. COLLINS
INVENTOR.
BY
ATTORNEY United States Patent Office 2,804,110
Patented Aug. 27, 1957

2,804,110

KEYHOLE SAW WITH DOUBLE PARALLEL CUTTING EDGES

George R. Collins, Pasadena, Calif.

Application January 5, 1954, Serial No. 402,280

7 Claims. (Cl. 145—31)

This invention relates to a keyhole saw construction, and to a method of manufacturing the keyhole saw with a minimum of forming operations. The invention is particularly directed to a keyhole saw having a long, narrow and untapered saw blade, so designed that a full-stroke sawing operation may be commenced immediately upon insertion of the blade into a starting hole.

In conventional keyhole saws, the blade tapers from a wide point adjacent the saw handle to a relatively narrow end point adapted to be inserted into a starting hole previously drilled in the object to be sawed. The taper is provided to prevent breakage or excessive flexibleness of the saw blade, but is highly undesirable in that it greatly restricts the utility of the saw and the efficiency of the sawing operation. In the first place, the relatively wide blade portion, adjacent the handle, prevents the taking of a full saw stroke until the narrow saw end has formed a saw cut of sufficient depth to receive the full width of the blade. Furthermore, the construction of the keyhole saw with a relatively wide blade end prevents the turning of a sharp corner without boring a separate starting hole and recommencing the entire procedure. Thus, if a rectangular block is to be cut out of a door, for example, it is necessary to bore starting holes at at least three of the corners of the area to be sawed. In an attempt to eliminate the above deficiencies, it has been proposed to provide a cylindrical keyhole saw, much in the nature of a rat-tail file, having saw teeth projecting radially from its entire circumference to permit sawing in any direction merely by changing the direction of pressing and without turning the handle. However, the latter type of saw is inefficient since the relatively large diameter of the saw blade necessitates the forming of an excessively wide saw cut.

In view of the above factors characterizing the field of keyhole saws, it is an object of the present invention to provide a keyhole saw which may be utilized to its full efficiency immediately upon commencement of the sawing operation, which may be turned to form a relatively sharp corner without forming a separate starting hole, and which has an efficient sawing action.

Another object of the invention is to provide a keyhole saw having a long, narrow, untapered blade of U-shaped section, and having a novel handle structure which may be removably associated with the blade by the insertion of only a single bolt.

A further object is to provide a novel method of forming the U-sectioned blade of the invention.

These and other objects and advantages of the invention will be more fully set forth in the following specification and claims considered in connection with the attached drawing to which they relate.

In the drawing:

Figure 1 is a side elevational view of the keyhole saw construction;

Figure 2 is a horizontal section along line 2—2 of Figure 1 and as viewed in the direction of the arrows;

Figure 3 is a vertical section along line 3—3 of Figure 1 and showing the construction of the means for mounting the saw blade on the saw handle; and Figure 4 is a vertical section along line 4—4 of Figure 1 and showing the U-shaped section of the saw blade.

Referring to the drawing, and particularly to Figure 1, the keyhole saw of the invention comprises a blade 10, a handle 11, and means 12 to removably secure the rear end portion of blade 10 to a forwardly extending mounting portion 13 of the handle. The present invention is particularly directed to the construction of the blade 10, which may be seen to be long and narrow and to have little or no taper tending to prevent the insertion of the full length of the blade into a relatively small starting hole.

According to the invention, the long, narrow and untapered construction of blade 10 is made possible by forming the blade with a U-shaped or channel section, best shown in Figure 4. The blade therefore has two parallel strips or sides 15 and 16 connected by an integral base 17 which is reverse bent to form the U. Along the major portion of the lower edge of each of the blade sides 15 and 16 are provided saw teeth 18 which may be of a conventional type. The teeth 18 are formed by providing the edges with a zigzag shape, and then giving the resulting triangular teeth 18 the necessary set. Preferably, the teeth 18 on one of the sides 15 and 16 are staggered relative to the teeth on the other side, as shown in Figure 1, to result in a more effective sawing action. The teeth 18 extend on sides 15 and 16 from adjacent the pointed forward end 19 of the blade to adjacent the mounting portion 13 of saw handle 11. However, the rear end portions 21 of the lower edges of sides 15 and 16 are left smooth in order to enhance the operation of mounting means 12.

Referring again to Figure 4, the parallel sides 15 and 16 of blade 10 are separated by a space 22 the width of which is partially determinative of the strength and resilience of the blade. When the space 22 is relatively large, the blade 10 is extremely rigid and strong but has a less efficient sawing action as compared to saws having blade sides 15 and 16 separated by a space 22 of lesser dimension. In a preferred form of the invention, the width of space 22 is less than half the thickness of either blade side 15 or 16 and is less than twice the set of saw teeth 18. Since the width of space 22 is less than twice the set of any saw tooth, that is to say less than the combined set of two adjacent saw teeth respectively formed on blade sides 15 and 16, the inner edges of the saw teeth overlap, as shown at 23 in Figure 4, to prevent any possibility that a ridge will be formed between the blade sides during the sawing operation.

It will be noted that the blade sides or strips 15 and 16 are sufficiently narrow to permit turning of the saw in order to form a relatively sharp corner, and are sufficiently long to provide an effective sawing action. As previously indicated, the sawing action is immediately fully effective since there is no wide blade portion to prevent full-length insertion of the blade into the starting hole. In spite of the absence of the conventional tapered blade, the construction of the blade 10 with a U-shaped section results in a strong, rigid and long-lasting blade, and one which is operative to form a relatively long cut during each sawing stroke. The operation of the saw, particularly when a relatively sharp corner is being turned, is enhanced by the pressure of spaced oblong slots 24 (Figures 1 and 4) formed in the blade base 17 and separated by unslotted portions 26. The slots 24 serve the purpose of facilitating corner turning since a sawing action takes place between the ends 27 of the unslotted base portions 26 and the sides of the saw cut. The width of the saw cut, at the corner, is thus increased sufficiently to permit the blade to be turned through a sharp angle.

The handle 11 may be of any variety and may be formed of metal, plastic, or other suitable material. A preferred form of handle, illustrated in Figures 1 and 2, comprises a grip portion 29 which is formed as a hollow metal shell and is suitably curved, generally at right angles to blade 10, to permit effective gripping by the operator. Portion 29 is integral with the mounting portion 13 which is of U-shaped section, as illustrated in Figure 3, and opens downwardly to provide for its nesting over the rear end portion of blade 10. The relative sizes of handle portion 13 and blade 10 are such that these elements are in surface engagement over a considerable length to effectively prevent any tendency of the blade to rock in its mounting. It is to be noted that the lower rear edges 21 of the blade extend, as indicated in Figures 1 and 3, slightly below the corresponding edges of handle portion 13 in order to increase the effectiveness of the mounting means 12 next to be described.

The means 12 comprise laterally expanded or rounded bulges 31 and 32 which are formed, respectively, in blade 10 and handle portion 13 generally midway between the grip 29 and the forward end of portion 13. Referring to Figure 3, the rounded portions 31 and 32 are in nesting relationship and are provided at their upper or base portions with apertures adapted to receive a downwardly extending mounting bolt 33 having a head 34 which seats on the upper surface of handle portion 32. At the lower threaded end of bolt 33 are mounted a suitable wing nut 36 and washer 37 adapted to press upwardly against the lower blade edges 21 to force the blade against the undersurface of handle portion 13. With such a construction, the single bolt 33 and wing nut 36 are operative to tightly lock the blade 10 relative to handle 11, and substitution of a fresh blade 10 may be effected in a matter of seconds. The locking relationship achieved by the pressing of washer 37 against blade edges 21 is improved by the fact that the diameter of bolt 33 is equal to the inner diameter of the rounded bulge 31 of blade 10, and also to the diameter of the aperture through the upper or base portion of bulge 32 of handle mounting portion 13.

The method of manufacturing the blade comprises providing a relatively long, flat blank having a width equal to the combined widths of blade sides 15 and 16 and base 17, and then forming the oblong slots 24 and also the teeth 18. The teeth 18 are then set, and the bulge 31 of mounting means 12 is formed in the same or a separate operation. Thereafter, the blank is return bent into the shape shown in Figure 4 of the drawing, and the completed blade results. The presence of slots 24 facilitates the bending operation, which is otherwise rather difficult due to the narrowness of the blank. It will be evident that the number and type of forming operations, which may comprise stamping, rolling, etc., may be varied in accordance with design considerations, since the essence of the method comprises the carrying out of all forming operations prior to the bending of the blade into U-shaped section. It will also be apparent that various modifications in the method may be employed, for example, the blank may be of extreme length and may be cut into blade lengths after rolling, stamping, etc.

While the particular method and apparatus herein disclosed in detail are fully capable of attaining the objects and providing the advantages hereinbefore stated, it is to be understood that they are merely illustrative of the presently preferred embodiments of the invention and that no limitations are intended other than as defined in the appended claims.

I claim:

1. A keyhole saw comprising a handle grip, a relatively long narrow blade connected at one end to said handle grip and being of integral U-section and provided with set saw teeth along the edges thereof remote from the bight portion of the U-section, the sides of said blade being parallel and spaced from one another, and the width of each of said sides being substantially uniform throughout the length of the blade, and the spacing between the blade sides being less than twice the set of said saw teeth.

2. A keyhole saw, comprising a handle grip, a relatively long narrow blade connected at one end to said handle, said blade being of integral U-section and provided with saw teeth along the edges remote from the bight portion of said U-section, the bight portion of said U-section being provided with longitudinally spaced apertures, and the blade portions at the end of each aperture being adapted to provide a cutting action relative to the object to be sawed.

3. A keyhole saw comprising a relatively long narrow and untapered sheet metal blade which is formed with two corresponding parallel sides connected by an integral base portion, said sides being spaced a short distance apart and being formed with saw teeth along their edges remote from said base portion, a handle grip secured to one end of said blade, and said base portion being formed along its edge remote from said saw teeth with means to effect cutting of the material being sawed.

4. A keyhole type saw comprising a saw blade detachably joined at one end to a handle by threaded fastener means, said blade being formed from a long narrow strip of sheet material provided with rows of set teeth along either lateral edge and bent into U-shape along its longitudinal center line with portions of adjacent teeth in substantial overlapping relation and with the lateral outer faces of the strip lying in closer proximity to one another than the outer corners of said rows of teeth, said handle having a hand grip portion and a U-shaped shank portion telescoped over one end of said blade, and aligned passage means through said blade and handle shank for receiving said threaded fastener clamping means.

5. A one-piece saw blade adapted to be clamped to a handle at one end and suitable for use in cutting keyholes and the like openings, said blade being formed from a long narrow strip of flexible metal having narrow slots blanked from spaced areas aligned along the longitudinal center line of said strip to facilitate the bending of said strip along said center line to form a long blade of U-shaped section transversely thereof and having closely spaced parallel legs, the adjacent end edges of said legs having saw teeth offset laterally from one another with the teeth on one edge offset into overlapping relation with teeth on the other edge, and means at one end of said blade for detachably clamping the same to a handle means.

6. A keyhole saw blade formed from a long narrow strip of metal of substantially uniform width, said strip having saw teeth along either lateral edge and a plurality of narrow slots in aligned relation along the longitudinal center line thereof, said strip being bent into U-shape along said center line with the side portions thereof in closely spaced relation to provide a thick saw blade having two rows of cutting teeth along one edge and a row of teeth along the back edge thereof formed by the ends of said narrow slots.

7. A keyhole saw blade of uniform transverse width from end to end thereof, said blade comprising a long narrow strip of sheet metal having a row of oppositely offset teeth along the opposite parallel edges thereof, said teeth extending the full length of said strip, and said strip having a sharp return bend extending along its longitudinal center line rigidly interconnecting the closely spaced teeth-supporting edges thereof, said teeth supporting edges being parallel and having the offset teeth thereof overlapping one another.

(References on following page)

References Cited in the file of this patent

UNITED STATES PATENTS

| | | |
|---|---|---|
| 333,690 | Stevenson | Jan. 5, 1886 |
| 643,098 | Arthur | Feb. 13, 1900 |
| 671,451 | Prouty | Apr. 9, 1901 |
| 1,414,608 | Watson | May 2, 1922 |
| 1,855,311 | Rasner | Apr. 26, 1932 |
| 1,902,177 | Mitchell | Mar. 21, 1933 |
| 2,149,241 | Savey | Feb. 28, 1939 |
| 2,375,651 | Henry | May 8, 1945 |
| 2,448,286 | Wieland | Aug. 31, 1948 |
| 2,534,001 | Couse | Dec. 12, 1950 |
| 2,573,573 | Jenkins | Oct. 30, 1951 |

FOREIGN PATENTS

| | | |
|---|---|---|
| 68,684 | Germany | May 19, 1893 |
| 545,224 | Germany | Feb. 26, 1932 |